United States Patent [19]

Southworth

[11] Patent Number: 4,565,263

[45] Date of Patent: Jan. 21, 1986

[54] SAWHORSE WITH EXTENDIBLE AND CONTRACTIBLE LEG ASSEMBLIES

[76] Inventor: Ted J. Southworth, 2494 Oaklane, Chetek, Wis. 54728

[21] Appl. No.: 743,090

[22] Filed: Jun. 10, 1985

[51] Int. Cl.⁴ .............................................. F16M 11/00

[52] U.S. Cl. .................................... 182/184; 182/185; 182/225; 248/188.5

[58] Field of Search ................................ 182/181-186, 182/224-226, 153, 155; 248/188.5, 413; 5/311

[56] References Cited

U.S. PATENT DOCUMENTS

| | | | |
|---|---|---|---|
| 414,903 | 11/1889 | Godillot | 248/188.5 |
| 758,130 | 4/1904 | Drummond | 182/184 |
| 769,447 | 9/1904 | McKinney | 248/188.5 |
| 2,325,592 | 8/1943 | Degler | 182/183 |
| 2,544,989 | 3/1951 | Garibaldi | 182/155 |
| 2,705,174 | 3/1955 | Squire | 182/184 |
| 3,110,360 | 11/1963 | Hearn | 182/155 |
| 3,144,914 | 8/1964 | Tjosvoll | 182/155 |
| 3,240,021 | 3/1966 | Meriaux et al. | 405/295 |
| 3,850,264 | 11/1974 | Salinas | 182/184 |
| 4,260,038 | 4/1981 | Plamondon | 182/184 |
| 4,457,397 | 7/1984 | Scala | 182/184 |
| 4,489,808 | 12/1984 | Voye | 182/225 |

FOREIGN PATENT DOCUMENTS

| | | | |
|---|---|---|---|
| 338297 | 6/1959 | Switzerland | 182/183 |

*Primary Examiner*—Reinaldo P. Machado
*Attorney, Agent, or Firm*—Burd, Bartz & Gutenkauf

[57] ABSTRACT

A sawhorse having adjustable leg assemblies that are selectively extendible and contractible to allow the cross beam to be moved to a selected elevation by a workperson. The leg assemblies have a pair of downwardly and outwardly diverging legs. Each leg has a stationary tubular member accommodating a movable member. A foot is secured to the movable member. A stop bar attached to the stationary member limits inward and outward movement of the movable member relative to the stationary member.

20 Claims, 6 Drawing Figures

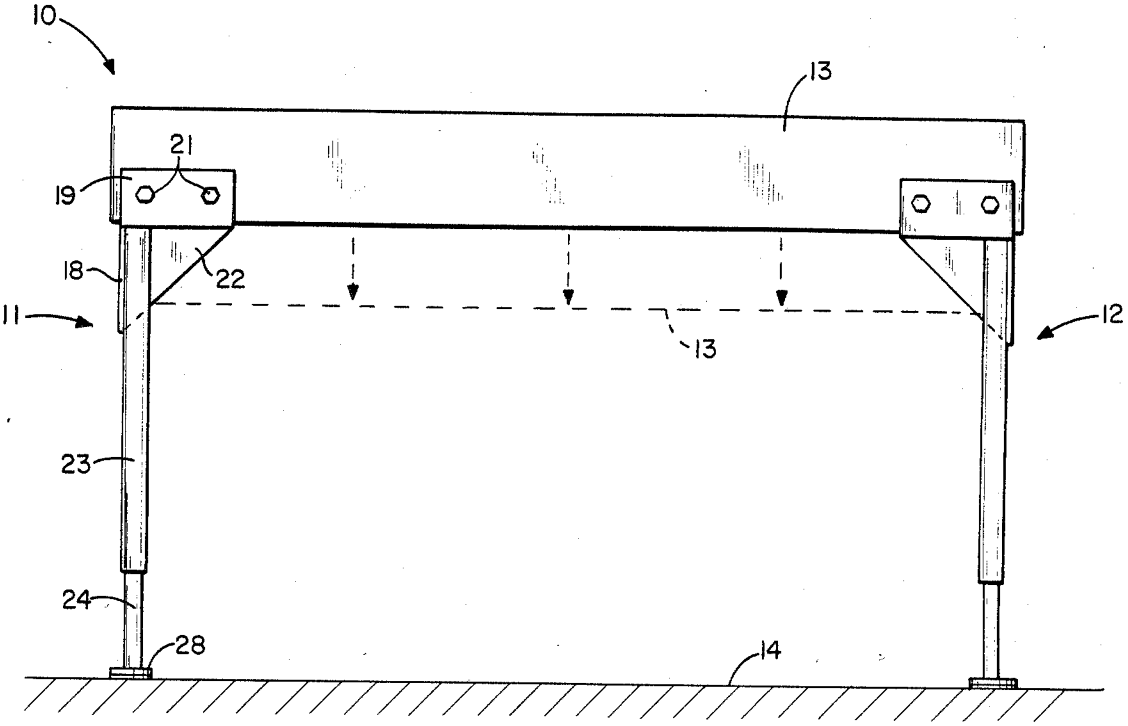
FIG. 1
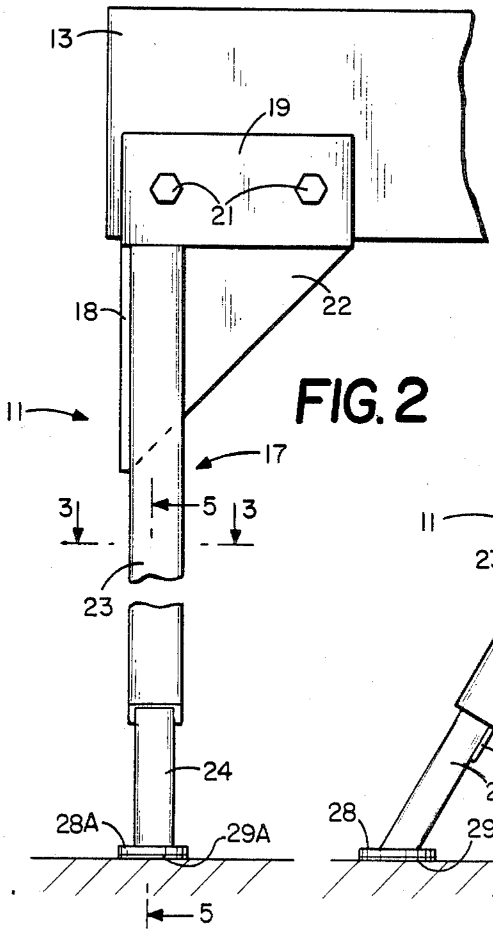
FIG. 2
FIG. 3
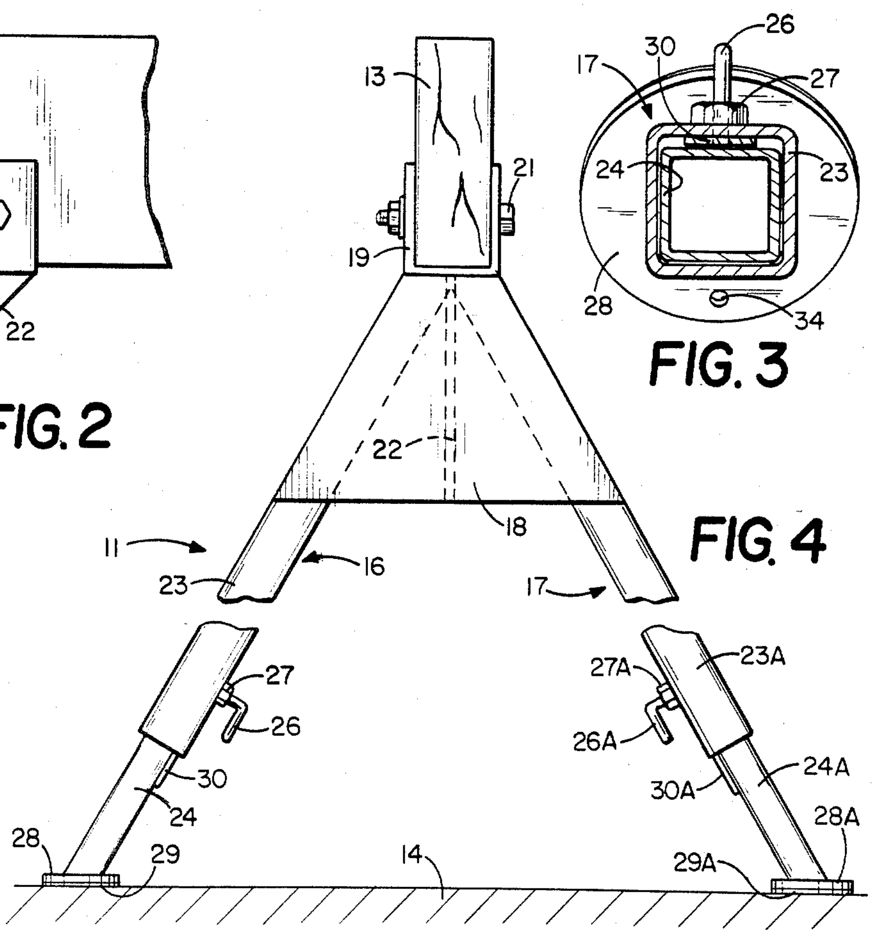
FIG. 4

SAWHORSE WITH EXTENDIBLE AND CONTRACTIBLE LEG ASSEMBLIES

FIELD OF INVENTION

The field of the invention is sawhorses used by carpenters, painters and the like to support a work piece above the ground.

BACKGROUND OF INVENTION

Sawhorses are used by carpenters, brick and stone means, plasterers, contractors and others as a convenient support and platform for accommodating work piece, such as lumber, mason products and the like. It is desirable to have the work products located at a elevation where it is convenient for the workperson. Sawhorses having adjustable length legs have been proposed to enable the workperson to adjust the working height of the cross beams of the sawhorses. Drummond in U.S. Pat. No. 758,130 discloses a sawhorse having adjustable length legs that are interlocked with each other to vary the height of the top piece of the sawhorse. Squire in U.S. Pat. No. 2,705,174 and Voye in U.S. Pat. No. 4,489,808 describe sawhorses having variations of adjustable leg structures to enable the workperson to change the working height of the cross pieces. These leg structures are difficult to adjust and are complex making them expensive to manufacture.

SUMMARY OF INVENTION

The invention is directed to a sawhorse having leg assemblies with selectively extendible and contractible legs which allow the cross beam of the sawhorse to be moved to a selected elevation by a workperson. The leg assemblies are self locking in their adjusted locations. One workperson can quickly and accurately adjust the elevation of the cross beam thereby adjust the position of the workpiece. The legs comprises pairs of telescoping tubular members that cooperate with each other to maintain the cross beam at a selected elevation. The sawhorse is economical and durable in construction and can be collapsed into relatively confined space for shipment and storage.

The preferred embodiment of the sawhorse has a cross beam having opposite ends. Preferably, the cross beam is an elongated 2×6 wood member. The first leg assembly is secured to one end of the cross beam and a second leg assembly is secured to the other end of the cross beam to support the cross beam at a selected elevation above a support surface. Each of the leg assemblies has a pair of downwardly and outwardly directed legs. The legs have adjacent upper ends that are secured to a generally U-shaped holder. The holder accommodates a portion of the cross beam and means for securing the holder to the cross beam. Each leg has a first tubular member with a longitudinal passage open at the lower end thereof. A second member telescopes into the passage of the first tubular member to provide for longitudinal adjustment of the leg. The second member has a lower end secured to a foot adapted to engage the support surface. A releasable lock mounted on the first member is engageable with the second member to hold the second member in an adjusted position and thereby maintain the selected elevation of the cross beam relative to the support surface. Cooperating stop means are secured to the first and second members to limit the outward and inward movement of the second relative to the first member. The stop means includes a stop bar secured to the first member. The stop bar has a first end extended into the passage and a second end projected downwardly away from the lower end of the first member. A block secured to the second member engages the first end of the stop bar to limit outward movement of the second member relative to the first member. The second end of the stop bar engages the foot means to limit inward movement of the second member relative to the first member and thereby prevent the second member from wedging into the lower end of the first member. Each of the legs are selectively adjustable so that the cross beam can be located in a level position in the event that the support surface is uneven.

DESCRIPTION OF DRAWING

FIG. 1 is a side elevational view of the sawhorse having the extendible and contractible leg assemblies of the invention;

FIG. 2 is an enlarged foreshortened side view of a leg assembly of the sawhorse of FIG. 1;

FIG. 3 is an enlarged sectional view taken along the line 3—3 of FIG. 2;

FIG. 4 is an enlarged foreshortened end view of the sawhorse of FIG. 1;

DESCRIPTION OF PREFERRED EMBODIMENT

Figure 5:
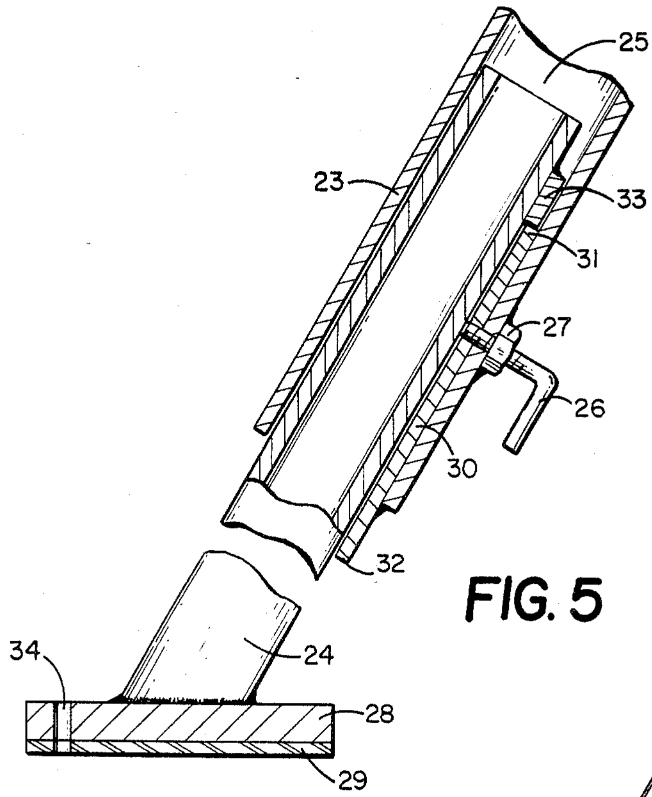
FIG. 5 is an enlarged sectional view taken along the line 5—5 of FIG. 2.

Referring to FIG. 1, there is shown a sawhorse of the invention indicated generally at 10 located on a support surface 14, such as a floor or ground. Sawhorse 10 has a pair of leg assemblies indicated generally at 11 and 12 that support a generally horizontal cross beam 13 at selected elevations above support surface 14. The cross beam 13 is a load supporting beam that is used to support a work product, such as wood, metal, wall board, and the like, at a convenient height for the workperson. Cross beam 13 is a wood member having the dimensions of 2×6. Other types of members can be used as a cross beam. Leg assemblies 11 and 12 are operable to allow the workperson to adjust the height of the cross beam 13 as indicated in broken lines in FIG. 1. The cross beam 13 in FIG. 1 can be moved to a lower position by retracting the leg assemblies 11 and 12. The leg assemblies 11 and 12 automatically lock in their adjusted positions to retain cross beam 13 in the selected elevation.

As shown in FIG. 4, leg assembly 11 is a unitary metal structure having a pair of downwardly and outwardly diverging legs 16 and 17 attached at their upper ends to a generally trapezoidal plate 18. The upper ends of the legs 16 and 17 and plate 18 are secured to an upwardly open U-shaped holder or channel member 19. An end of cross beam 13 is located within holder 19. A pair of nut and bolt assemblies 21 secure cross beam 13 to holder 19. A longitudinal reinforcing gusset 22 having a generally triangular shape is secured to the bottom of holder 19 and the inside of plate 18. Gusset 22 extends between the adjacent upper ends of the legs 16 and 17.

As shown in FIG. 3, leg 16 has an elongated linear square tubular member 23 telescopingly accommodating a second linear tubular member 24. Member 24 is of a size to slidably fit into passage 25 of first member 23. As shown in FIG. 3, the adjacent side walls of the first and second members has a square cross section and are in sliding contact relation with each other. Second member 24 has a close sliding fit relation with the inside walls of first member 23. The close sliding fit relation between members 23 and 24 predicate the automatic lock feature of the legs when a load is placed on the sawhorse. An additional releasable lock is used to hold the second member 24 in a fixed relation with respect to first member 23. The releasable lock has an elbow bolt 26 threaded into a nut 27. Nut 27 is welded to the inside of the lower end of member 23. The bolt 26 is threaded through nut 27 and through a hole in the inner wall of first member 23 to engage second member 24.

A circular shoe or pad 28 is secured to the lower end of second member 24 by welds or the like. The bottom of the shoe 28 has a rubber pad or sole 29 that frictionally engages the support surface 14. Pad 28 has a hole 34 to accommodate a nail or screw to fasten the pad to a floor or like support surface.

Leg 17 has the same structure as leg 16. The parts of leg 17 that correspond to leg 16 have the same reference numerals with the suffix A.

Figure 6:
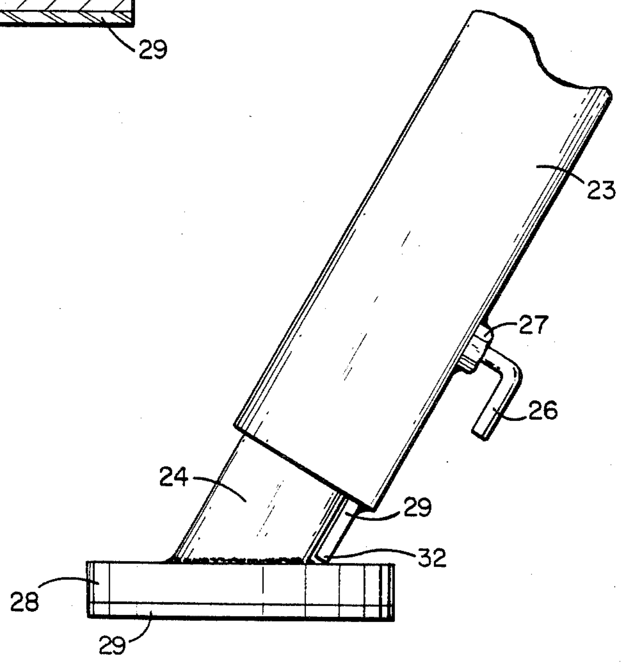
FIG. 6 is an enlarged side view of the lower end of a leg assembly in a retracted position.

As shown in FIGS. 3 and 5, an elongated generally flat stop plate or bar 30 is secured to the lower end of member 23. Bar 30 extends up into passage 25 adjacent the inside wall of member 23. The upper portion of bar 30 has a stop end 31. The lower portion of bar 30 project downwardly from the open end of member 23 and terminates in a lower stop end 32. As shown in FIG. 6, when second member 24 is in its in or retracted position, stop end 32 engages the top of shoe 28. This prevents second member 24 from sticking or jamming into the end of first member 23. Returning to FIG. 5, bolt 26 extends through a hole in bar 30 to engage the adjacent walls of second member 24 to apply an outward force to second member 23 thereby retain second member 24 in a fixed position relative to first member 23. The upper end of second member 23 is located above bar 30. A block 33 is secured to the inside wall of member 23. As shown in FIG. 5, block 33 engages upper stop end 31 to limit the outward movement of second member 24. When block 33 engages stop end 31 member 24 is in its fully extended position. Block 33 and stop bar 30 prevent second member 24 from being pulled out of first member 23.

The sawhorse 10 is used to support a work piece, such as wood, metal, plastic, and the like at a convenient location for a workperson. The working height of the work piece can be adjusted by changing the length of legs 16 and 17 of each of leg assemblies 11 and 12. The leg assemblies 11 and 12 can be separately adjusted to level cross beam 13 and accommodate for different contours of the support surface 14. The bolts 26 are initially turned to release the holding force on the second members 24. Each second member 24 can be selectively pulled out or pushed into first member 23 thereby changing the linear extent or length of leg 16. Second member 24 can be telescoped into first member 23 to a position that places the cross beam 13 at a selected elevation. The weight of the cross beam and upper portion of leg assembly 11 will hold the second member 24 in its adjusted position. The outside wall faces of the second member 24 frictionally engage the adjacent inside wall surfaces of first member 23 to thereby automatically retaining the second leg member 24 in its adjusted position. Bolt 26 is then turned down to firmly lock second member 24 with the first member 23. Leg assemblies 11 and 12 are unitary metal structures that support cross beam 13. The cross beam 13 can be a wood member or rigid metal. Sawhorse 10 is rugged and durable in construction and can be quickly and easily collapsed for shipment and storage.

While there has been shown and described a preferred embodiment of the sawhorse, it is understood that changes in the parts, structures, materials of the parts and arrangements of the parts may be made by those skilled in the art without departing from the invention. The invention is defined in the following claims.

The embodiments of the invention in which an exclusive privilege or property is claimed are defined as follows:

1. A sawhorse comprising: a cross beam having opposite ends, a first leg assembly secured to one end of the cross beam, and a second leg assembly secured to the other end of the cross beam, each of said leg assemblies having a pair of downwardly and outwardly directed legs having adjacent upper ends, a U-shaped holder secured to said upper ends, said cross beam being located in said holder, means securing the holder to the cross beam, each leg comprising a first tubular member having a longitudinal passage open at the lower end thereof and a second member telescoped into said passage of the first tubular member, foot means on the lower end of the second member adapted to engage a support surface, releasable lock means mounted on the first member engageable with the second member to hold the second member in an adjusted position thereby adjusting the elevation of the cross beam relative to the support surface, a stop bar secured to said first member, said stop bar having a first end extended into the passage and a second end projected downwardly away from the lower end of said first member, block means secured to said second member, said block means engageable with said first end of the stop bar to limit outward movement of the second member relative to the first member, said second end of the stop bar engageable with the foot means to limit inward movement of the second member relative to the first member.

2. The sawhorse of claim 1 including: a first transverse plate secured to the upper ends of the legs, and a second gusset plate secured to said holder and first plate, said second plate being normally disposed with respect to said first plate.

3. The sawhorse of claim 2 wherein: the first plate has a trapazoidal shape.

4. The sawhorse of claim 1 wherein: said foot means includes a shoe secured to the lower end of the second member, said shoe having a bottom surface, and yieldable pad means located over the bottom surface and secured thereto.

5. The sawhorse of claim 1 wherein: the stop bar is an elongated generally flat bar extending into the lower end of the passage in the first member.

6. The sawhorse of claim 1 wherein: the first tubular member has a generally square cross section, and the second member has a generally square cross section of a size to slidably fit into the passage of the first tubular member.

7. The sawhorse of claim 1 wherein: said lock means comprises a member having a threaded bore secured to the first member, and a bolt thread through said bore engageable with said second member to hold the second member in an adjusted position relative to the first member.

8. A sawhorse comprising: a cross beam having opposite ends, a first leg assembly secured to one end of the cross beam, and a second leg assembly secured to the other end of the cross beam, each of said leg assemblies having a pair of downwardly directed legs, said legs having adjacent upper ends and diverging outwardly from said upper ends, a holder secured to said upper ends, said cross beam being adapted to be secured to said holder, means securing the holder to the cross beam, each leg comprising a first tubular member having a longitudinal passage open at the lower end thereof and a second member telescoped into said passage of the first tubular member whereby the length of the leg can be adjusted, foot means on the lower end of the second member adapted to engage a support surface, stop bar means secured to said first member, said stop bar means having a first end extended into said passage and a second end projected downwardly away from the lower end of the first member, block means secured to said second member, said block means engageable with said first end of the stop bar means to limit outward movement of the second member relative to the first member, said second end of the stop bar engageable with the foot means to limit inward movement of the second member relative to the first member.

9. The sawhorse of claim 7 including: a first transverse plate secured to the upper ends of the legs, and a second gusset plate secured to said holder means and said first plate, said second plate being normally disposed relative to the first plate.

10. The sawhorse of claim 8 wherein: said first plate has a general trapazoidal shape and is secured to said legs and holder means.

11. The sawhorse of claim 7 wherein: said foot means includes a shoe secured to the lower end of the second member, said shoe having a bottom surface, and yieldable pad means located over the bottom surface and secured thereto.

12. The sawhorse of claim 7 wherein: a stop bar means is an elongated bar extended into the lower end of the passage of the first member.

13. The sawhorse of claim 7 wherein: the first tubular member has a generally square cross section, and the second tubular member has a generally square cross section of a size to slidably fit into the passage of the first tubular member.

14. The sawhorse of claim 7 wherein: releasable lock means mounted on the first member engageable with the second member to hold the second member in a selected adjusted position, said lock means including a member having a threaded bore secured to the first member, and a bolt threaded through said bore and engageable with the second member.

15. A leg assembly for a sawhorse comprising: a pair of downwardly directed legs, said legs having adjacent upper ends and diverging outwardly from said upper ends, a holder secured to said upper ends for accommodating a cross beam, each leg comprising a first tubular member having a longitudinal passage open at the lower end thereof and a second member telescoped into said passage of the first tubular member, foot means on the lower end of second member adapted to engage a support surface, stop bar means secured to said first member, said stop bar means having a first end extended into the passage and a second end projected downwardly away from the lower end of the first member, block means secured to said second member, said block means engageable with said end of the stop bar to limit outward movement of the second member relative to the first member, said second end of the stop bar engageable with the foot means to limit inward movement of the second member relative to the first member.

16. The leg assembly of claim 14 including: a first transverse plate secured to the upper ends of the plate, and a gusset plate secured to said holder and first plate, said second plate being normally disposed with respect to said first plate.

17. The leg assembly of claim 14 wherein: said foot means includes a shoe secured to the lower end of the second member, said shoe having a bottom surface, and yieldable pad means located over the bottom surface secured thereto.

18. The leg assembly of claim 14 wherein: the stop bar is an elongated generally flat bar extended into the lower end of the passage in the first member.

19. The leg assembly of claim 14 wherein: the first tubular member has a generally square cross section, and the second member has a generally square cross section of a size to slidably fit into the passage of the first tubular member.

20. The leg assembly of claim 15 including: releasable lock means mounted on the first member engageable with the second member to hold the second member in an adjusted position relative to the first member.

* * * * *